Dec. 28, 1926.
A. J. MORRIS
1,612,041
FISHING TOOL
Filed April 29, 1925
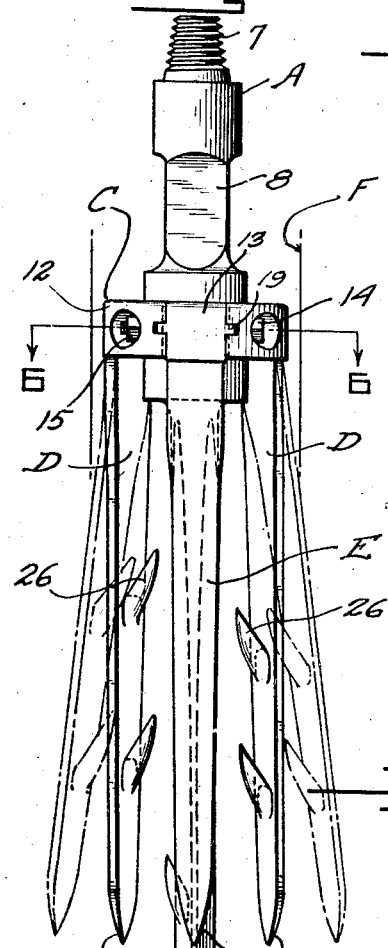
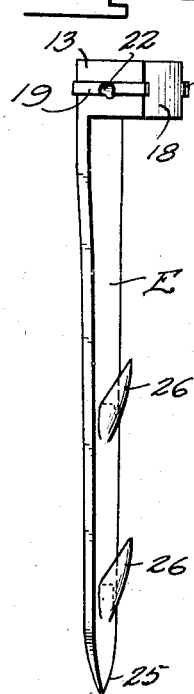
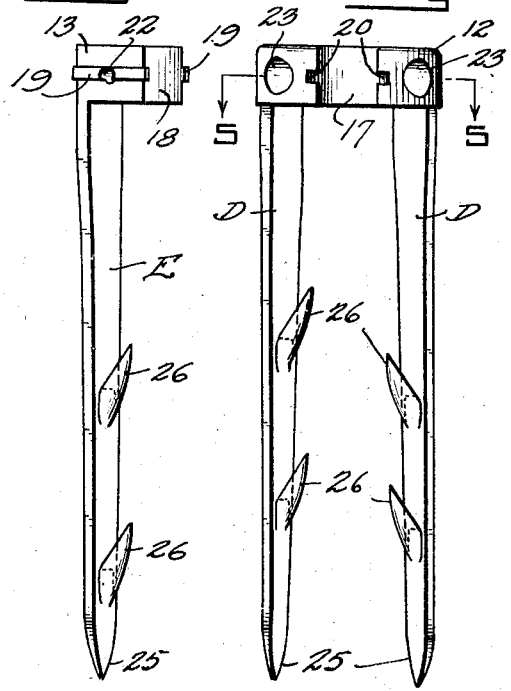
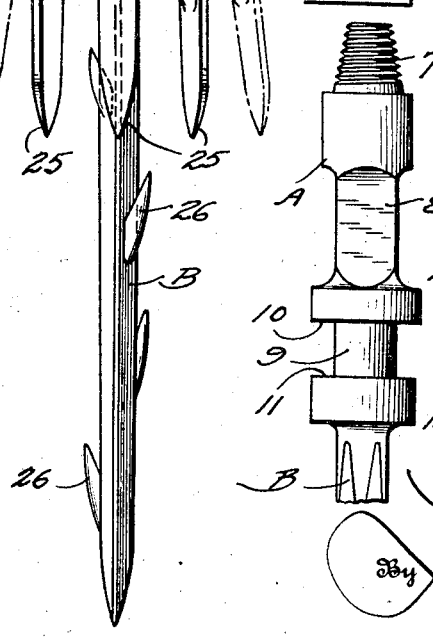
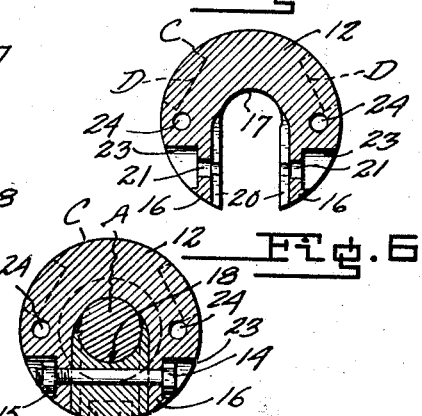
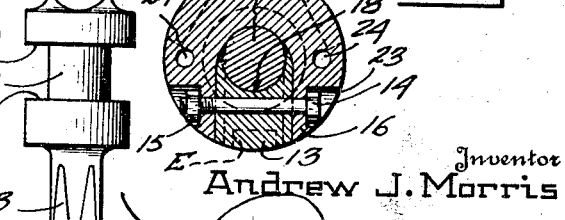
Inventor
Andrew J. Morris
By Lancaster and Allwine
Attorneys Patented Dec. 28, 1926.

1,612,041

UNITED STATES PATENT OFFICE.

ANDREW J. MORRIS, OF CHARLESTON, WEST VIRGINIA.

FISHING TOOL.

Application filed April 29, 1925. Serial No. 26,702.

The present invention relates to well tools and more particularly to such used for removing broken wire or manila cable from wells, known as grabs and spears.

When a cable breaks and a portion thereof drops into the well hole, such portion usually assumes an irregular partially spiraliform position engaging the well wall at many points. Much difficulty, resulting in loss of time and expenditure of large sums of money, has resulted by the use of ordinary rope spears and other fishing tools in an attempt to recover such cable portions. This has been due, to quite some extent to this inherent tendency of the cable portion to more or less coil when released and engage the well wall at a great number of points with a comparatively unobstructed central way in which the fishing tool may descend. Unless an operator of such tools has had much experience and is very careful, the fishing tool is apt to descend to that extent beyond the upper end of the cable in the well that when the fishing tool is drawn upwardly, it engages the cable so remote from the upper end thereof that the cable becomes wadded or matted in the well above the fishing tool. In some instances wells have been abandoned because of the inability to remove such wadding or matting of the cable in the well.

The principal objects of the present invention are first, to provide fishing tools particularly well adapted for use in the recovery of wire and manila rope cables or lines from wells, which will be limited in their descension so that the cables, or lines will not become wadded or matted above the tools thus avoiding the employment of highly skilled labor or possible loss of time and material; second, tools which will aid in displacing the cable from its upper end, downwardly so that the wickers of the tools may more effectively engage the cable and withdraw the same from the well; and third to provide fishing tools which are adjustable to best meet the particular conditions involved so that it is not necessary to stock separate complete tools for use in well holes of many different diameters.

Another object of the invention is to provide fishing tools, more particularly known as rope or cable grabs, having a plurality of wings or prongs, which may be dismembered to more readily remove the cable from the grab when the grab has served its purpose and to more readily adjust or return to place, the wings or prongs of the tool.

Other objects and advantages of the invention will appear in the following detailed description, taken in connection with the accompanying drawings, forming a part of this specification, and in which drawings:

Figure 1 is a side elevation of one embodiment of my present invention and showing in dot and dash lines an adjusted position of wings or prongs thereof.

Figures 2 and 3 are perspective views of parts of the fishing tool, shown in Figure 1, removed from its main body portion.

Figure 4 is a fragmentary elevation of the upper portion of the main body of the tool.

Figures 5 and 6 are cross sectional views on the lines 5—5 and 6—6 of Figures 3 and 1, respectively.

In the drawings, where similar characters designate like or corresponding parts, or characteristics thereof, throughout the views, A designates a main body portion, such as a shaft and which in the example shown, includes a spear B; C a flange carried by the main body portion A in such a manner that it may be readily detached therefrom; and D and E prongs carried by the flange C. The wall of the well hole is indicated at F by dot and dash line.

The shaft A is adapted for connection to a string of tools, not shown in the drawings, by having at its upper end portion a reduced tapered screw threaded extension 7 constituting one of the companion members of the usual type of taper joint used in well drilling equipment. There is also provided a portion 8, polygonal in cross section which may be engaged by a wrench to facilitate attachment and detachment of the tool with respect to the string of tools. Beneath portion 8 is a reduced portion 9, preferably circular in cross section and confronting abutments 10 and 11 against which the flange C may abut. The spear B is disposed below the abutment 11, and may be of the usual center type spear commonly used in removing broken wire or manila cable from wells.

Referring now to the flange C, it is perfectly circular in plan and comprises a major portion 12 and a minor portion 13, these portions secured together in any suitable manner, as by bolt 14 equipped with a nut 15. The major portion 12 is preferably U-shaped, so as to have arms 16 adapted to embrace the shaft A at its reduced portion 9, and the minor portion 13 is preferably in the nature of a filler piece adapted to be disposed between the arms 16. In the example shown, the major portion 12 has an arcuate wall 17, substantially as a semi-circle in plan so as to fit nicely the reduced portion 9. The minor portion 13 also has an arcuate wall 18 of similar size and shape for a like purpose. It is preferred to provide on the minor portion 13, laterally extending ribs 19 adapted to fit grooves 20 formed in the confronting faces of the arms 16 of major portion 12, thus relieving strain upon the bolt 14 which retains the minor portion 13 in place. The shank of the bolt 14 extends through aligned apertures 21 in the arms 16 and an aperture 22 extending transversely through the minor portion 13. The outer faces of the arms 16 may be recessed as at 23 to receive the head of the bolt 14, and the nut 15, these recesses being preferably large enough to accommodate socket wrenches which may be used in the placing and removal of the nut and bolt. In order that the tool may be used in wells containing water and to facilitate the descension and ascension of the tool, the flange may be provided with transverse apertures 24, through which water may circulate.

It is to be observed that the main body portion A, with its spear B may be made of a size suitable for use in a well hole of a diameter which will not require the use of the collar C if the main body or shaft portion forming shoulder 11 is of a diameter relative to the well hole diameter, that the clearance between the two is considerably less than the diameter of the cable to be recovered inasmuch as, when the fishing tool descends, the upper end of the cable in the well hole will be engaged by the fishing tool before the latter has descended to that extent where liability of wadding or matting of the cable above the tool will take place. However, in order that this main body portion may be used in well holes of different diameters, different sizes of flanges C may be provided, any one of which may be readily assembled into operative relation to the main body portion A, so that the clearance between the periphery of the flange and the wall F of the well hole will be considerably less than the diameter of the cable to be recovered. It is not necessary therefore to have available a number of different sizes of center spears, in order to be equipped for the recovery of cables lost in different sizes of wells.

The fishing tool may be equipped with one or more prongs, and in the example shown, there are three prongs, two of which, (those designated D), are carried by the major portion 12 of the flange, and that designated E, carried by the minor portion 13 of said flange. These prongs are tapered at their lower portions as indicated at 25 and the prongs are preferably symmetrically disposed about the axis of the shaft 8. They are preferably welded to the flange and are provided with wickers 26 at faces confronting the axis of the shaft 8, or, as in the example shown, confronting the central spear B, which likewise is provided with the usual wickers 26.

The prongs D and E are preferably of bendable material, that is, of such material that they may be heated, as in a forge, and bent, as indicated by dot and dash lines in Figure 1 so that their axes diverge downwardly, thereby adapting the tool to well holes of different diameters.

There are many advantages in having one of the prongs carried by the detachable minor portion 13 of the flange and among which may be mentioned the fact that in the case of removing a cable from the grab, at the top of the hole, one prong may be removed, as by detaching the minor portion 13 from the major portion 12 thus aiding in detaching the cable which has been drawn into intimate contact with a number of the wickers. Also, the removal of the prong E, and the minor portion 13 from assembled relation to the prongs D and the major portion 12 makes it possible to more readily heat and bend the prongs for adjusting purposes, or for returning such prongs to normal position if they have become accidentally bent out of place.

Among the important advantages of the fishing tools are the arrangement whereby the tools may be adjusted to meet particular conditions at the election of the operator and the arrangement whereby the tool cannot descend to that extent where a considerable amount of cable in the hole becomes disposed above the fishing tool, inasmuch as the upper portion of the cable will be engaged by the flange C, or by the prongs if such are a part of the equipment, and danger of the cable becoming wadded or matted above the fishing tool is avoided.

Changes in details may be made without departing from the spirit or scope of my invention; but,

I claim:

1. A fishing tool for the recovery of cables in wells, comprising a shaft adapted for connection to a string of tools, and a flange detachably connected to said shaft intermediate its ends, said flange of a diameter relative to the diameter of the well, that the clearance between the two is less than the diameter of the cable to be recovered.

2. A fishing tool for the recovery of cables in wells, comprising a shaft adapted for connection to a string of tools, said shaft having a reduced portion intermediate its ends providing confronting shoulders, and a flange detachably carried by said shaft and of a diameter relative to the diameter of the well, that the clearance between the two is less than the diameter of the cable to be recovered, said flange comprising a U-shaped major portion embracing said shaft at its reduced portion and engageable with said shoulder, and a minor filler portion detachably connected between the arms of said major portion.

3. A fishing tool for the recovery of cables in wells, comprising a shaft adapted for connection to a string of tools, said shaft having a reduced portion intermediate its ends providing confronting shoulders, and a flange detachably carried by said shaft and of a diameter relative to the diameter of the well, that the clearance between the two is less than the diameter of the cable to be recovered, said flange comprising a U-shaped major portion embracing said shaft at its reduced portion and engaged with said shoulder, and a minor filler portion detachably connected between the arms of said major portion, one of said portions provided with ribs and the other with cooperating grooves.

4. A fishing tool for the recovery of cables in well, comprising a shaft adapted for connection to a string of tools, said shaft having a reduced portion intermediate its ends providing confronting shoulders, a flange detachably carried by said shaft and of a diameter relative to the diameter of the well, that the clearance between the two is less than the diameter of the cable to be recovered, said flange comprising a U-shaped major portion embracing said shaft at its reduced portion and engageable with said shoulders, and a minor filler portion detachably connected between the arms of said major portion, one of said portions provided with ribs and the other with cooperating grooves, and a bolt extending through said arms and minor portions.

5. A cable grab comprising in combination, a central spear, and a plurality of prongs spaced about said spear, the confronting faces of said spear and prongs provided with wickers, the wickers of the central spear being below the wickers of said prongs.

6. A fishing tool comprising, a shaft adapted for connection to a string of tools, said shaft having a reduced portion intermediate its ends providing confronting shoulders, a flange detachably carried by said shaft at said reduced portion and engageable with said shoulders, said flange capable of being placed and removed by movement in a plane transversely of the axis of said shaft, and prongs carried by said flange and having wickers on their faces confronting the axis of said shaft.

7. A fishing tool for the recovery of cables in wells, comprising, a shaft adapted for connection to a string of tools, a flange detachably connected to said shaft intermediate its ends, said flange of a diameter relative to the diameter of the well, that the clearance between the two is less than the diameter of the cable to be recovered, and prongs carried by said flange and having wickers on their faces confronting the axis of said shaft.

8. A fishing tool comprising, a shaft adapted for connection to a string of tools, said shaft having a reduced portion intermediate its ends providing confronting shoulders, a flange detachably carried by said shaft, said flange comprising a major portion embracing said reduced portion of the shaft between its abutment and a minor portion removably carried between the embracing portions of the major portion, a plurality of prongs carried by said major portion of the flange, and a prong carried by said minor portion thereof, said prongs having wickers on their faces confronting the axis of said shaft.

9. A fishing tool for the recovery of cables in wells, comprising a shaft adapted for connection to a string of tools, said shaft having a reduced portion intermediate its ends providing confronting shoulders, a flange detachably carried by said shaft and of a diameter relative to the diameter of the well, that the clearance between the two is less than the diameter of the cable to be recovered, said flange comprising a U-shaped major portion embracing said shaft at its reduced portion and engageable with said shoulders, and a minor filler portion detachably connected between the arms of said major portion, a plurality of prongs carried by said major portion of the flange, and a prong carried by said minor portion of the flange, said prongs provided with wickers on confronting faces.

10. A cable grab comprising in combination, a central spear adapted for connection to a string of tools and having a reduced portion at its upper end providing confronting shoulders, a flange, detachably carried by said spear at said reduced portion and engageable with said shoulders, said flange capable of being placed and removed by movement in a plane transversely of the axis of said spear, and prongs carried by said flange, said prongs provided with wickers on faces confronting said spear.

11. A cable grab comprising in combination, a central spear adapted for connection to a string of tools and having a reduced portion at its upper end providing confronting shoulders, a flange, detachably carried by said spear at said reduced portion and engageable with said shoulders, said flange capable of being placed and removed by movement in a plane transversely by the axis of said spear, and prongs carried by said flange, said prongs and spear provided with wickers at confronting faces.

12. A cable grab comprising in combination, a central spear adapted for connection to a string of tools and having a reduced portion at its upper end providing confronting shoulders, a flange, detachably carried by said spear at said reduced portion and engageable with said shoulders, said flange capable of being placed and removed by movement in a plane transversely by the axis of said spear, and bendable prongs carried by said flange, said prongs capable of taking a permanent set when bent to adjusted positions, and said prongs provided with wickers at faces confronting said spear.

13. In a cable grab, the combination of a central spear, and two or more bendable prongs disposed about said central spear and carried thereby, said prongs provided with wickers at faces confronting said spear, and said prongs capable of taking a permanent set when bent to adjusted positions.

14. In a cable grab, the combination of a central spear, and two or more bendable prongs disposed about said central spear and carried thereby, said prongs and spear provided with wickers at confronting faces, and said prongs capable of taking a permanent set when bent to adjusted positions.

15. A cable grab comprising in combination, a central spear adapted for connection to a string of tools and having a reduced portion at its upper end providing confronting shoulders, a flange, detachably carried by said spear comprising a U-shaped major portion embracing said spear at said reduced portion and engageable with said shoulders, and a minor filler portion detachably connected between the arms of said U-shaped portion, a plurality of prongs carried by said U-shaped portion, and a prong carried by said filler portion, said prongs provided with wickers at faces confronting said spear.

16. A cable grab comprising in combination, a central spear adapted for connection to a string of tools and having a reduced portion at its upper end providing confronting shoulders, a flange, detachably carried by said spear comprising a U-shaped major portion embracing said spear at said reduced portion and engageable with said shoulders, and a minor filler portion detachably connected between the arms of said U-shaped portion, a plurality of prongs carried by said U-shaped portion, and a prong carried by said filler portion, said prongs and spear provided with wickers at confronting faces.

ANDREW J. MORRIS.